United States Patent [19]

Scalise

[11] Patent Number: 5,778,201

[45] Date of Patent: Jul. 7, 1998

[54] CLOCK AND COUNTER FOR BIT CELL DETERMINATION AND TIMEOUT TIMING FOR SERIAL DATA SIGNALING ON AN APPLE DESKTOP BUS

[76] Inventor: Albert M. Scalise, 3107 Elaine Dr., San Jose, Calif. 95124

[21] Appl. No.: 591,855

[22] Filed: Jan. 26, 1996

[51] Int. Cl.$^6$ .................................................. G06F 13/00
[52] U.S. Cl. ............................................ 395/306; 395/309
[58] Field of Search ..................................... 395/280, 306, 395/557, 559

[56] References Cited

U.S. PATENT DOCUMENTS 3,859,631  1/1975  Holmes et al. .............. 340/146.1 R
4,713,832  12/1987  Hutson ............................. 377/45

*Primary Examiner*—Jack B. Harvey
*Assistant Examiner*—Jigar Pancholi
*Attorney, Agent, or Firm*—Mark A. Aaker

[57] ABSTRACT

A method for bit cell determination and timeout detection for an Apple Desktop Bus, using a counter clocked by a clock generator, according to the steps of: At the start of a bit cell, loading an initial value into the counter and enabling the counter to count down as clocked by the clock generator. Counting down until a low to high transition in the input ADB signal is detected or a terminal count is reached, such that if the low to high transition transition is detected, then enabling the counter to count up, else if the terminal count is reached, then indicating a timeout condition. If the counter is enabled to count up, then counting up until a high to low transition in the input ADB signal is detected or the terminal count is reached, such that if the high to low transition is detected, then stopping the counter and reading a final value to determine the bit cell value, else if the terminal count is reached, then indicating a timeout condition.

8 Claims, 5 Drawing Sheets

| Timing Value Registers | Register Size | Physical Max | Physical Max Limit μS | Min In Spec | hex | Timing Value μS | Max In Spec | hex | Timing Value | Default Value | hex | Timing Value μS |
|---|---|---|---|---|---|---|---|---|---|---|---|---|
| Zero Low Time | 6 bits | 63 | 128.52 | 31 | 1F | 63.24 | 33 | 21 | 67.32 | 32 | 20 | 65.28 |
| One Low Time | 5 bits | 31 | 63.24 | 17 | 11 | 34.68 | 18 | 12 | 36.72 | 17 | 11 | 34.68 |
| Reset Pulse Width | 12 bits | 4095 | 8353.8 | 1471 | 5BF | 3000.8 | | | | 1471 | 5BF | 3000.8 |
| Synch Pulse Width | 6 bits | 63 | 128.52 | 31 | 1F | 63.24 | 32 | 20 | 65.28 | 32 | 20 | 65.28 |
| Attention Pulse Width | 9 bits | 511 | 1042.44 | 381 | 17D | 777.24 | 403 | 193 | 822.12 | 393 | 189 | 801.72 |
| Stop Pulse Width | 6 bits | 63 | 128.52 | 34 | 22 | 69.36 | 35 | 23 | 71.4 | 35 | 23 | 71.4 |
| Bit Cell Period TO | 7 bits | 127 | 259.08 | 35 | 23 | 71.4 | 63 | 3F | 128.52 | 64 | 40 | 130.56 |
| Stop to Start Pulse Width | 8 bits | 255 | 520.2 | 69 | 45 | 140.76 | 127 | 7F | 259.08 | 130 | 82 | 265.2 |

CLOCK AND COUNTER FOR BIT CELL DETERMINATION AND TIMEOUT TIMING FOR SERIAL DATA SIGNALING ON AN APPLE DESKTOP BUS

FIELD OF THE INVENTION

This invention relates to the field of data communications, and more particularly to receiving and interpreting signals on an Apple Desktop Bus.

BACKGROUND OF THE INVENTION

The Apple Desktop Bus (ADB) of Apple Computer, Inc., is a data bus for connecting peripheral devices such as a keyboard and mouse to a computer system. The ADB is an asynchronous serial communications bus controlled by a single ADB bus controller. A description of the physical and electrical characteristics of the ADB, and a description of the data signaling and communications protocol used on the ADB can be found in U.S. Pat. Nos. 4,875,158, 4,910,655, 4,912,627, 4,918,598, 5,128,677 and 5,175,750 and in the publication "Inside Macintosh, Devices" by Apple Computer, Inc., copyright 1994, published by Addison-Wesley Publishing Company, and in co-pending United States Patent Application AN ASIC CELL IMPLEMENTATION OF A BUS CONTROLLER WITH PROGRAMMABLE TIMING VALUE REGISTERS FOR THE APPLE DESKTOP BUS filed Jan. 5, 1996, naming the same inventor as this patent application.

FIG. 1 illustrates the general form of signals on the Apple Desktop Bus. ADB signals occur in packets which begin with Attention and Sync signal patterns and end with a Stop signal pattern. The data bits within a packet are in a pulse width modulated form where each data bit is signaled by periods of low and high signal level during a "bit cell" or time period allocated for a data bit. A bit cell starts when the signal level moves from high to low. During the bit cell, the signal level moves from low to high. The current bit cell is ended, and the next bit cell starts when the signal level again moves from high to low. "Bit cell determination" is the process of deciding what digital data value, "0" or "1", is signaled during the bit cell. The above-referenced ADB documentation specifies how the digital data value of a bit cell is determined by the length of the low and high times in relation to the total bit cell time. In general, a long low time indicates a "0" bit, while a long high time indicates a "1" bit. The invention of this patent application makes certain simplifying assumptions regarding normal ADB signal times, and uses the ratio of the high time to the low time to determine the value of a bit cell. In general, a longer low time indicates a "0" bit, while a longer high time indicates a "1" bit.

In addition to detecting the signal level transitions, measuring the low and high times, and performing bit cell determination, a useful ADB device must also detect if signaling stops and a timeout condition occurs. For example, if a low signal is held longer than a specified maximum time, then a timeout has occurred and ADB signaling must start over with a new packet.

In the past, ADB devices have needed several different timers and comparators to perform these functions. Alternatively, a programmed microcontroller has been used. However, a simpler and less expensive method of ADB bit cell determination and timeout detection has been desired. This invention provides a simple method for using a counter clocked by a clock generator to perform these functions. The same circuitry can also be used as a programmable timer to generate ADB bit cells and other pulse width modulated portions of the ADB serial signal stream.

SUMMARY OF THE INVENTION

This invention provides a method for bit cell determination and timeout detection for an Apple Desktop Bus, using a counter clocked by a clock generator, according to the steps of: At the start of a bit cell, loading an initial value into the counter and enabling the counter to count down as clocked by the clock generator. Counting down until a low to high transition in the input ADB signal is detected or a terminal count is reached, such that if the low to high transition is detected, then enabling the counter to count up, else if the terminal count is reached, then indicating a timeout condition. If the counter is enabled to count up, then counting up until a high to low transition in the input ADB signal is detected or the terminal count is reached, such that if the high to low transition is detected, then stopping the counter and reading a final value to determine the bit cell value, else if the terminal count is reached, then indicating a timeout condition.

In this way, a single counter can be used to determine the bit cell value and to detect timeout conditions for an input ADB signal. The same circuitry can also be used as a programmable timer to generate ADB bit cells and other pulse width modulated portions of the ADB serial signal stream by loading an initial value into the counter, enabling counting down, and waiting for the terminal count to be reached. These and other advantages of the invention will be appreciated by a person skilled in the field from a consideration of the following drawings, description and claims.

BRIEF DESCRIPTION OF THE DRAWINGS

FIG. 6 lists various timing values for use of the clock generator and counter as a programmable timer.

DETAILED DESCRIPTION

Figure 1:
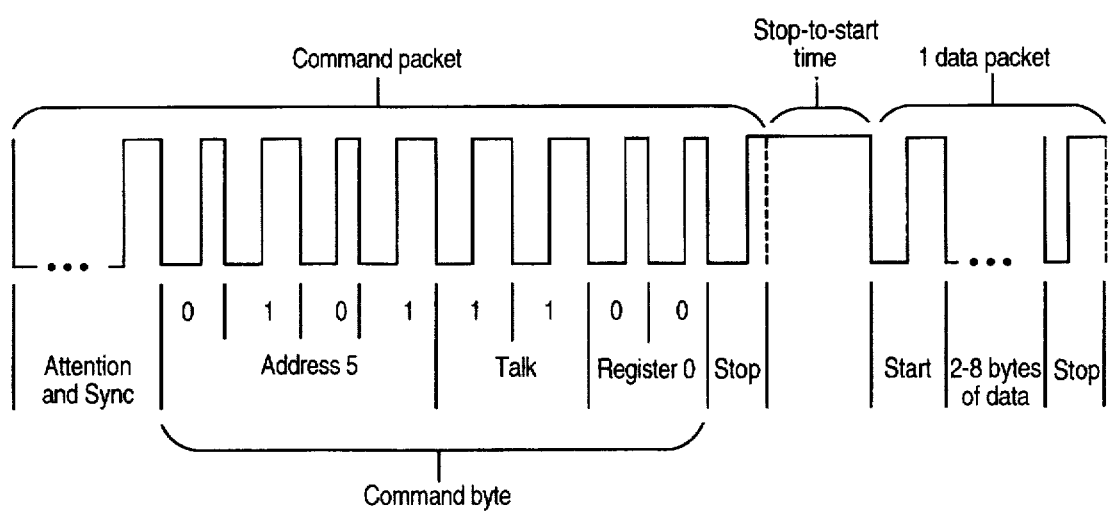
FIG. 1 illustrates the general form of signals on the Apple Desktop Bus.
Figure 2:
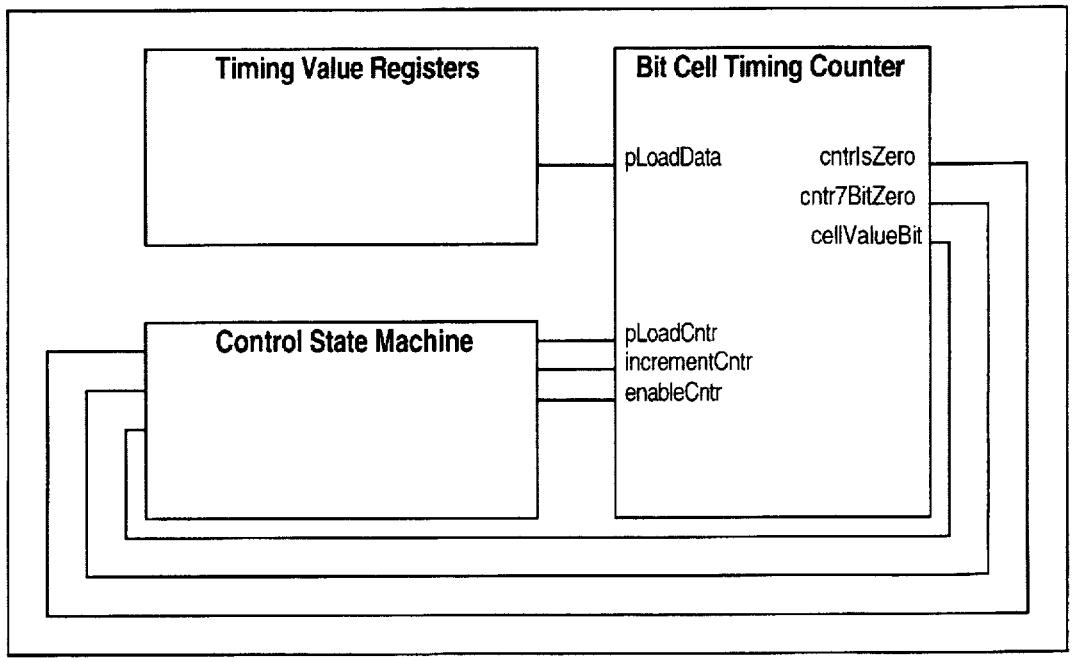
FIG. 2 is a block diagram of portions of an ADB device used for bit cell determination and timeout detection in accordance with this invention.

FIG. 2 is a block diagram of portions of an ADB device used for BIT CELL DETERMINATION AND TIMEOUT DETECTION in accordance with this invention. The relevant portions of the ADB device include Timing Value Registers, a Bit Cell Timing Counter, and a Control State Machine. The Timing Value Registers hold timing values to be used by the Bit Cell Timing Counter. The Bit Cell Timing Counter has within it a clock generator and counter for performing the method of bit cell determination and timeout detection. The Control State Machine controls the operation of the Bit Cell Timing Counter, including loading an initial value from the Timing Value Registers, enabling counting, changing the direction of counting, and reading the final value or terminal count indication.

Figure 3:
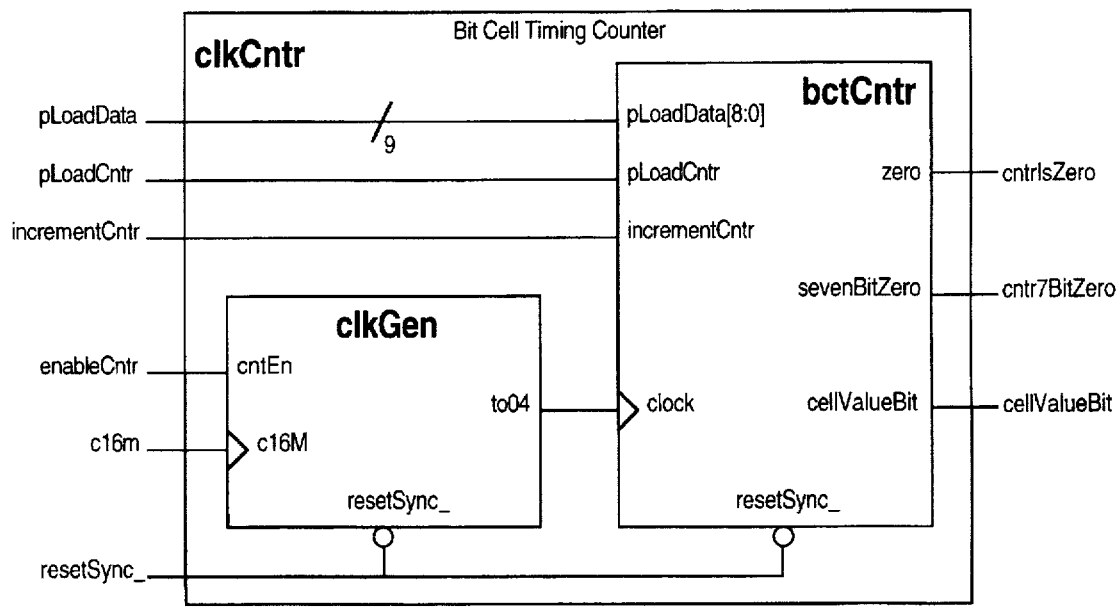
FIG. 3 is a more detailed block diagram of the Bit Cell Timing Counter of FIG. 2, showing the clock generator and counter portions.

FIG. 3 is a more detailed block diagram of the Bit Cell Timing Counter of FIG. 2, showing the clock generator and counter portions. The clock generator, labeled clkGen, uses a system clock, c16m, to generate an internal clock signal, to04, for the clocking of the counter, bctCntr. For example, a 16 MHz system clock can be divided by 32 to generate a 2.04 microsecond internal clock. When enabled by the control state machine, this clock is provided by the clock generator to the counter. When disabled, the clock output is a logic low signal, and the internal state of the clock generation circuit is reset. In this implementation, the clock output signal is generated from the falling edge of the input clock.

The counter, bctCntr, is a single nine bit counter with inputs for parallel load of an initial value from the Timing Value Registers, and an increment control to control counting up or counting down.

In this implementation, the counter provides two different outputs for indicating when a terminal count of zero has been reached. The first output, cntr7BitZero, indicates when a terminal count of zero is reached on the seven least significant bits, and is used for bit cell determination and timeout detection. The second output, cntrlsZero, indicates when a terminal count of zero is reached on all nine bits, and is used when the counter is used as a programmable timer to generate ADB bit cells and other pulse width modulated portions of the ADB serial signal stream.

The counter also provides an output, cellValueBit, of the value of bit 6 of the counter. In this implementation, bit 6 alone is a sufficient indication of the final value of the counter in order to determine the bit cell value. That is, through coordination of the selection of the clock generator period, the initial value, and the counter size, the implementation makes the value of bit 6 indicate the proper bit cell value when counting is stopped.

Figure 4:
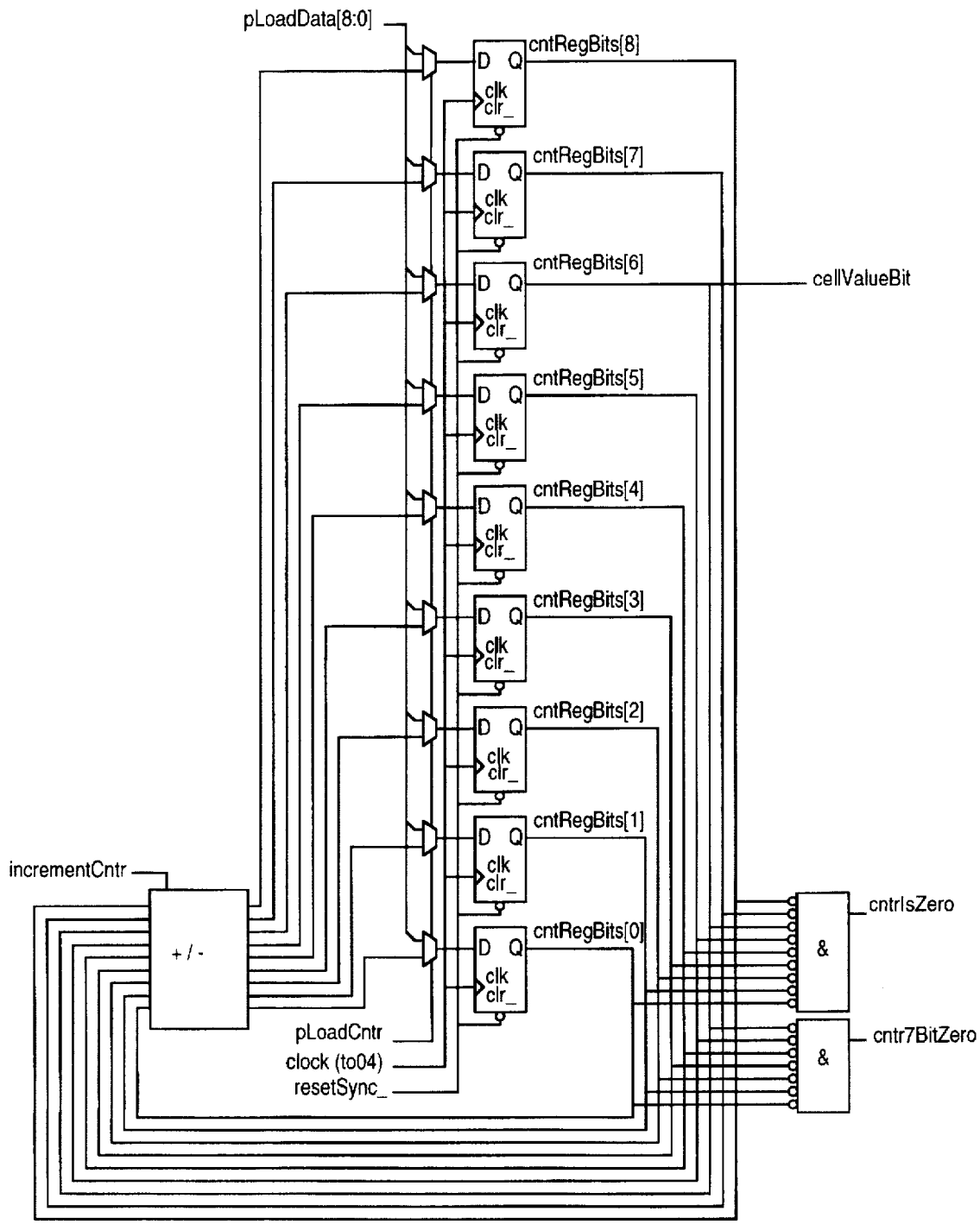
FIG. 4 is a simplified circuit diagram of the counter portion of the Bit Cell Timing Counter of FIG. 3.

For system startup or system reset, both the clock generator and the counter can be reset. FIG. 4 is a simplified circuit diagram of the counter portion of the Bit Cell Timing Counter of FIG. 3. The counter is a single nine bit counter with with bits labeled 0 through 8.

For inputs, the counter has a load control, pLoadCntr, and a nine bit wide input data path, pLoadData[8:0], for parallel load of an initial value from the Timing Value Registers into the counter. An increment control, incrementCntr, is used to control counting up or counting down. There are also inputs for the clock, to04, and for a reset signal, resetSync_.

For outputs, the counter provides the two different outputs for indicating when a terminal count of zero has been reached. The first output, cntr7BitZero, indicates when a terminal count of zero is reached on the seven least significant bits. The second output, cntrIsZero, indicates when a terminal count of zero is reached on all nine bits. The counter also provides an output, cellValueBit, of the value of bit 6 of the counter.

It should be noted from FIG. 4 that only a small number of logic blocks are required to provide the circuitry for bit cell determination, timeout detection and programmable timing. This is a simple and inexpensive implementation of these functions for an ADB device.

Figure 5:
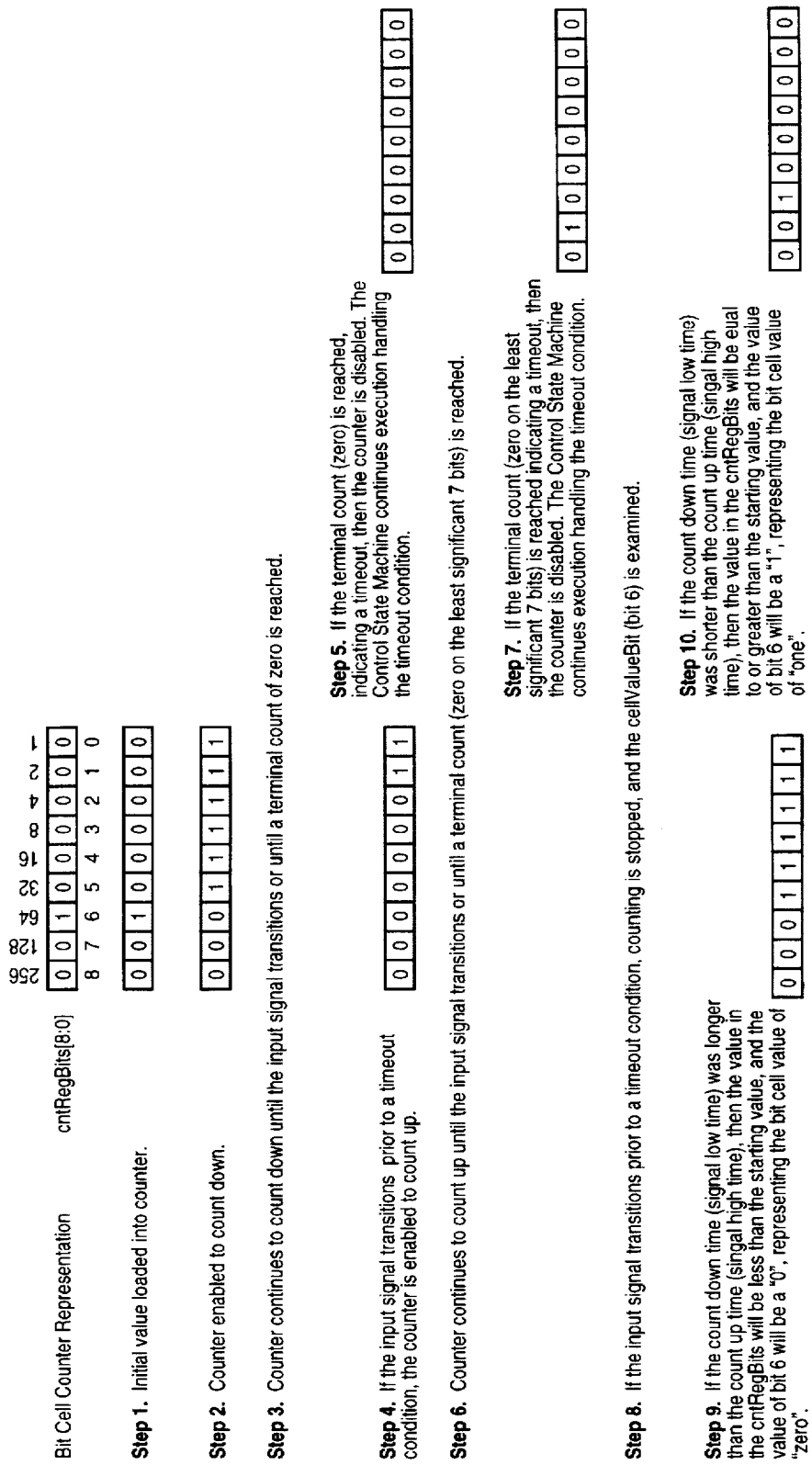
FIG. 5 illustrates the method of using a clock generator and counter for bit cell determination and timeout detection in accordance with this invention.

FIG. 5 illustrates the method of using a clock generator and counter for bit cell determination and timeout detection in accordance with this invention. At the top of FIG. 5 and next to each step is shown a representation of a possible set of counter bits for that step. The method includes the following steps:

Step 1. At the start of a bit cell, an initial value is loaded into the counter. For example, when it is known that a bit cell is expected, the counter is loaded with an initial value of 64 (decimal), which is a "1" in bit 6 of the counter.

Step 2. The counter is enabled to count down. Counting occurs at the clock rate provided by the clock generator, i.e. one count each 2.04 microseconds.

Step 3. The counter continues to count down until the input ADB signal transitions from low to high, or until a terminal count of zero is reached on the seven least significant bits of the counter, indicating a timeout condition. The Control State Machine monitors the incoming ADB signal, looking for a change in the input ADB signal level.

Step 4. If the input signal transitions from low to high prior to a timeout condition, then the counter is enabled to count up.

Step 5. Otherwise, if the terminal count of zero is reached, indicating a timeout, then the counter is disabled and the Control State Machine continues execution handling of the timeout condition.

Step 6. If the counter is enabled to count up, then the counter continues to count up until the input ADB signal transitions a second time (i.e., high to low) or until a terminal count of zero is reached on the seven least significant bits of the counter.

Step 7. If the terminal count is reached indicating a timeout condition, then the counter is disabled and the Control State Machine continues execution handling of the timeout condition.

Step 8. If the input ADB signal transitions prior to a timeout condition, counting is stopped and the final counter value is examined at bit 6.

Step 9. If the count down time (signal low time) was longer than the count up time (signal high time), then the final value in the counter will be less than the initial value, and bit 6 will be a zero. This zero is shifted into the shift register of the Control State Machine to be used as the bit cell digital value. The method can now be repeated for another bit cell by returning to Step 1.

Step 10. If the count down time (signal low time) was shorter than the count up time (signal high time), then the final value in the counter will be equal to or greater than the initial value, and bit 6 will be a one. This one is shifted into the shift register of the Control State Machine to be used as the bit cell digital value. The method can now be repeated for another bit cell by returning to Step 1.

In this manner, the clock generator and counter are used for bit cell determination and timeout detection. The timeout times can be calculated as follows. When counting down, 64 counts are needed to count from the initial value down to zero, multiplied by the clock period 2.04 microseconds, for a timeout period of 130 microseconds. For the other timeout, after the signal transition from low to high, the counter could be as low as 1, and have to count up to 128 (which results in zeros on all seven least significant bits) for a total count of 127 counts multiplied by the clock period 2.04 microseconds, for a worst case timeout period of 259 microseconds. This particularly long timeout causes no detrimental effects, since a timeout is always an unrecoverable event. When a timeout event occurs, the bit cell determination ceases, and the Control State Machine is notified of the error condition.

The clock generator and counter is also used as a programmable timer to generate ADB bit cells and other pulse width modulated portions of the ADB serial signal stream. For use as a programmable timer, a timing value is preloaded into the counter, and the counter is counted down to the terminal count. FIG. 6 lists various timing values for use of the clock generator and counter as a programmable timer.

For example, the "Zero Low Time" specifies the amount of time that the ADB signal is held in a low state to indicate a Zero data bit. This value is stored in 6 bits and can therefore have a physical value between 0 and 63. These physical values correspond to timing values in microseconds by multiplying by 2.04 microseconds, so that a maximum value of 63 would correspond to a maximum time period of 128.52 microseconds. The ADB specifications specify minimum and maximum values for a parameter such as a minimum timing value of 63.24 microseconds and a maximum value of 67.32 microseconds, corresponding to values between 31 (hex 1F) and 33 (hex 21) with a default value of 32 (hex 20) corresponding to a timing of 65.28 microseconds. The default value is loaded from the Timing Value Registers into the counter, and the counter is counted down to zero. At zero, the Control State Machine is notified, and the next portion of the ADB signal is generated. The duration of the Zero Low Time can be changed by changing the value of the corresponding bits stored in the programmable Timing Value Register to a new value. In this use, only 6 bits of the counter are needed, but in other uses the entire nine bits of the counter will be used. Timeout is indicated by the output cntrIsZero, which indicates a zero on all nine bits. Nine bits are sufficient to generate all of the short duration timing events required for the ADB serial stream. A second, separate, counter clocked by a slower clock can be used to generate the very long duration ADB events, such as the 3 millisecond ADB reset.

Other variations will be apparent to one skilled in the field from a consideration of the preceding description. It is intended that the scope of the invention should be limited only as set forth in the claims which follow.

What is claimed is:

1. A method for bit cell determination and timeout detection for an Apple Desktop Bus, using a counter clocked by a clock generator, comprising the steps of:

starting a bit cell when an input ADB signal moves from high to low;

at the start of the bit cell, loading an initial value into the counter and enabling the counter to count down as clocked by the clock generator;

counting down until a low to high transition in the input ADB signal is detected or a terminal count is reached; such that if the low to high transition is detected, then enabling the counter to count up, else if the terminal count is reached, then indicating a timeout condition; and if the counter is enabled to count up, then counting up until a high to low transition in the input ADB signal is detected or the terminal count is reached; such that if the high to low transition is detected, then stopping the counter and reading a final value to determine the bit cell value, else if the terminal count is reached, then indicating a timeout condition.

2. A method as is claim 1 wherein reading a final value to determine the bit cell value comprises reading a single bit of the counter.

3. A method as is claim 1 further comprising the clock and counter are also used for programmable timing by the steps of:

loading a new initial value into the counter and enabling the counter to count down as clocked by the clock generator; and counting down until a terminal count is reached indicating a timeout.

4. A method as is claim 1 further comprising repeating the steps for another bit cell to determine another bit cell value.

5. A method for bit cell determination and timeout detection for an Apple Desktop Bus, using a nine bit counter clocked by a clock generator, comprising the steps of:

at the start of a bit cell indicated by a high to low transition of an input ADB signal, loading an initial value of 64 into the counter and enabling the counter to count down as clocked by the clock generator at a rate of 2.04 nicroseconds;

counting down until a low to high transition in the input ADB signal is detected or a terminal count of zero is reached; such that if the low to high transition is detected, then enabling the counter to count up, else if the terinal count of zero is reached, then indicating a timeout condition; and if the counter is enabled to count up, then counting up until a high to low transition in the input ADB signal is detected or the terminal count of zero on the least significant seven bits of the counter is reached; such that if the high to low transition is detected, then stopping the counter and reading a final value of bit 6 of the counter to determine the bit cell value, else if the terminal count of zero on the least significant seven bits of the counter is reached, then indicating a timeout condition.

6. A method as is claim 5 wherein reading a final value of bit 6 of the counter to determine the bit cell value comprises if the value of bit 6 is zero, then the bit cell value is zero, and if the value of bit 6 is one, then the bit cell value is one.

7. A method as is claim 5 further comprising the clock and counter are also used for programmable timing by the steps of:

loading a new initial value into the counter and enabling the counter to count down as clocked by the clock generator; and counting down until a terminal count is reached indicating a timeout.

8. A method as is claim 5 further comprising repeating the steps for another bit cell to determine another bit cell value.

* * * * *

UNITED STATES PATENT AND TRADEMARK OFFICE
CERTIFICATE OF CORRECTION

PATENT NO. : 5,778,201
DATED : July 7, 1998
INVENTOR(S) : Albert M. Scalise

It is certified that error appears in the above-identified patent and that said Letters Patent is hereby corrected as shown below:

In the claims:
Claim 5, column 6, line 22, "nicroseconds" should read - -microseconds - -
Claim 5, column 6, line 28, "terinal" should read - -terminal- -.

Signed and Sealed this

Fifth Day of January, 1999

Attest:

Attesting Officer

*Acting Commissioner of Patents and Trademarks*